United States Patent [19]

Andersson et al.

[11] Patent Number: 5,403,134
[45] Date of Patent: Apr. 4, 1995

[54] SHANK FOR A MILLING TOOL

[75] Inventors: Kjell Andersson, Fagarsta; Bertrand Riviere, Bourges, France

[73] Assignee: Seco Tools AB, Fagersta, Sweden

[21] Appl. No.: 242,660

[22] Filed: Apr. 21, 1994

[30] Foreign Application Priority Data

Nov. 8, 1991 [SE] Sweden ................. 9103292

[51] Int. Cl.⁶ .................. B23B 31/107; B23C 5/26
[52] U.S. Cl. .................. 409/234; 279/83; 408/226; 408/239 R; 403/362
[58] Field of Search .............. 279/83; 408/226, 238, 408/239 R, 239 A, 240; 409/232, 234; 403/362

[56] References Cited

U.S. PATENT DOCUMENTS

| 3,022,084 | 2/1962 | Dresback | 279/83 |
| 3,811,694 | 5/1974 | Dahlman et al. | 279/83 |
| 4,647,052 | 3/1987 | Butikofer | 279/83 |

FOREIGN PATENT DOCUMENTS 2804250  8/1979  Germany .

*Primary Examiner*—Steven C. Bishop
*Attorney, Agent, or Firm*—Burns, Doane, Swecker & Mathis

[57] ABSTRACT

A shank carries a milling tool and has a clamping portion adapted to be mounted in a bore of a chuck. The chuck has first and second locking screws which are engageable with first and second recesses, respectively, formed on a cylindrical outer surface of the clamping portion of the shank. The first recess is configured such that the first locking screw urges the clamping portion into the bore to press a surface of the shank against the chuck. The second recess comprises first and second longitudinally adjacent planar surfaces which form an angle with one another. Depending upon the angle of inclination of the second locking screw (that angle varies in different types of chucks), the second locking screw will flushly engage one or the other of the surfaces for preventing rotation of the shank within the bore.

20 Claims, 4 Drawing Sheets

SHANK FOR A MILLING TOOL

RELATED APPLICATION

This is a Continuation of co-pending PCT Application Ser. No. PCT/SE92/00760, filed Nov. 4, 1992, which designated the United States.

BACKGROUND OF THE INVENTION

The present invention relates to a shank for a milling tool, preferably an end mill. The invention also relates to a coupling arrangement between a shank for a milling tool and a chuck.

Rotating tool shanks of cylindrical shape can be clamped in holders of different types, e.g., Weldon-chucks and Whistlenotch-chucks. In these chucks the axial locking and the rotational driving are special for each type of holder. Examples of standard types of a Weldon-chuck and a Whistlenotch-chuck will be given below.

The prior art device shown in FIG. 1 includes a standard chuck 10 of Weldon type and a prior art standard shank 11 that is received in an axial boring 12 of the chuck 10. A first locking screw 13 and a second locking screw 14 are arranged in mating first and second radial borings 15 and 16 in the chuck 10, the radial borings 15 and 16 having a longitudinal extension (axis) generally transverse to the longitudinal center axis 17 of the boring 12. The longitudinal center axis 17 is also the longitudinal center axis of the chuck 10 and the shank 11 when the shank 11 is mounted in the boring 12 of the chuck 10.

The locking screws 13 and 14 are externally threaded while the radial borings 15 and 16 are internally threaded. When rotating the locking screws 13 and 14 they are displaced in the radial direction of the chuck 10 either inwardly or outwardly depending upon the direction of rotation of the locking screws 13 and 14.

The shank 11 is provided with two recesses 18 and 19 having a certain extension both radially and axially. The recesses 18 and 19 are designed to cooperate with the locking screws 13 and 14.

Before clamping the shank 11 in the boring 12 of the chuck 10 it is checked that the locking screws 13 and 14 are in a position to allow the shank 11 to be inserted in the boring 12. After the shank 11 is inserted in the boring 12 to a predetermined extent the locking screws 13 and 14 are displaced radially inwardly by rotating the locking screws 13 and 14 in a predetermined direction. As is indicated in FIG. 1 the first locking screw 13 is in its active position cooperating with the recess 18 and exerting forces upon the shank 11 that will lock the shank 11 in the axial direction. It is also indicated in FIG. 1 that the second locking screw 14 in its active position cooperates with the recess 19 and exerts a force upon the shank that will prevent the shank 11 from rotating relative to the chuck 10.

The prior art device in FIG. 2 shows a standard chuck 20 of Whistlenotch type and a prior art standard shank 21 that is received in an axial boring 22 of the chuck 20. A locking screw 23 is received in a radial boring 24 of the chuck 20. The screw 23 is externally threaded while the radial boring 24 is internally threaded. The longitudinal axis of the locking screw 23 has an extension (axis) transverse to the longitudinal center axis 25 of the axial boring 22. The longitudinal center axis 25 is also the longitudinal center axis of the chuck 20 and the shank 21 when the shank 21 is mounted in the axial boring 22. However, the longitudinal axis of the locking screw 23 is not perpendicular to the longitudinal center axis 25 of the chuck 20 but rather is angled 2° from perpendicular, i.e., 2° relative a radius of the shank, to exert an axial force upon the shank 21 that is directed towards the bottom of the axial boring 22.

The shank 21 has a planar recess 26 that runs generally in the longitudinal direction of the shank 21, the planar recess being angled relative to the longitudinal axis of the shank 21. By cooperation of the locking screw 23 and the recess 26 the shank 21 will be forced towards the bottom of the axial boring 22. This means that the screw 23 locks the shank 21 against axial outward displacement and simultaneously against rotation around its longitudinal center axis 25 relative to the chuck 20.

The prior art holders for cylindrical tool shanks described above are not stabilized to a sufficient degree. The present invention deals with designing the tool shank in such a way that an increased stability is achieved also when using standard holders, e.g., prior art Weldon-chucks and Whistlenotch-chucks.

SUMMARY OF THE INVENTION

The present invention relates to a shank for carrying a milling tool and adapted to be clamped in a chuck. The shank comprises a machining portion for carrying a milling tool, and a clamping portion which is of smaller cross section than the machining portion to form therebetween a transition surface extending transversely of a longitudinal axis of the clamping portion. The clamping portion includes a cylindrical outer periphery having first and second recesses. The first recess is adapted to be engaged by a first locking screw of a chuck for clamping the transition surface against the chuck. The second recess is adapted to be abutted by a second locking screw of the chuck for preventing rotation of the shank about the axis. The second recess includes first and second longitudinally adjoining surfaces inclined relative to one another.

One of the first and second surfaces is preferably disposed parallel to the axis, and the other of the first and second surfaces is inclined from the one surface toward the axis, such that one end of the other surface is disposed closer to both the transition surface and the axis than an opposite end of that surface. The other surface is preferably positioned between the transition surface and the one surface.

The first and second surfaces preferably form an angle of 182°, and each of the first and second surfaces is preferably planar.

The first and second recesses are preferably spaced apart in the longitudinal direction, and the transition surface preferably extends perpendicular to the axis.

The first recess preferably includes a wall portion oriented such that a locking screw bearing thereagainst produces a force having a longitudinal component directed away from the transition surface, in order to clamp the transition surface against a contact surface of the chuck.

The present invention also relates to a combination of the above-described shank and a chuck having a shank-receiving bore, and first and second locking screws for engaging the first and second recesses, respectively, of the shank.

BRIEF DESCRIPTION OF THE DRAWINGS

The objects and advantages of the invention will become apparent from the following detailed description of a preferred embodiment thereof in connection with the accompanying drawings in which like numerals designate like elements, and in which.

DETAILED DESCRIPTION OF A PREFERRED EMBODIMENT OF THE INVENTION

Figure 1:
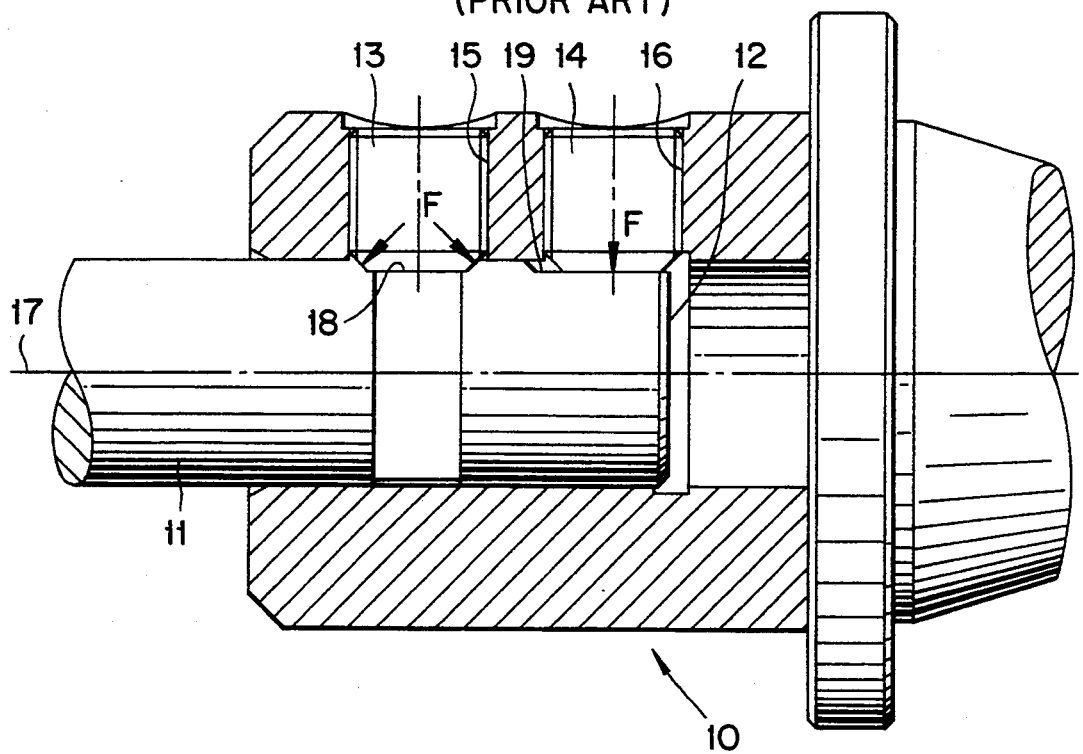
FIG. 1 shows a Weldon-chuck holding a prior art shank.
Figure 2:
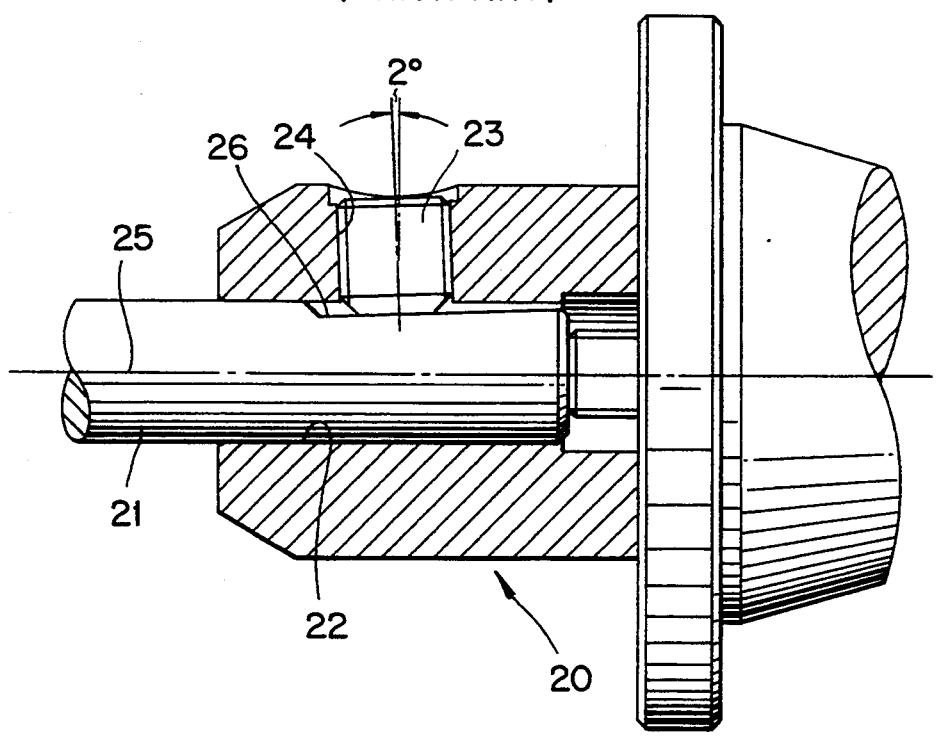
FIG. 2 shows a Whistlenotch-chuck holding a prior art shank.
Figure 3A:
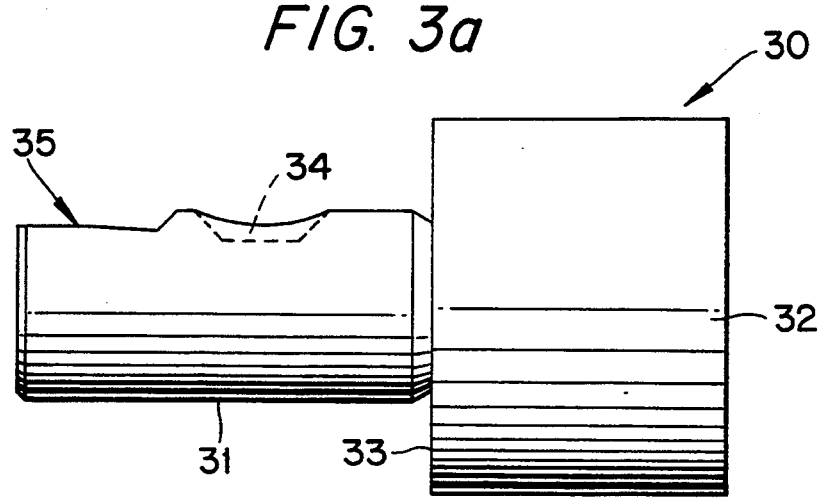
FIGS. 3a-3c show top, side and perspective views, respectively, of an embodiment of a tool shank according to the present invention.
Figure 3B:
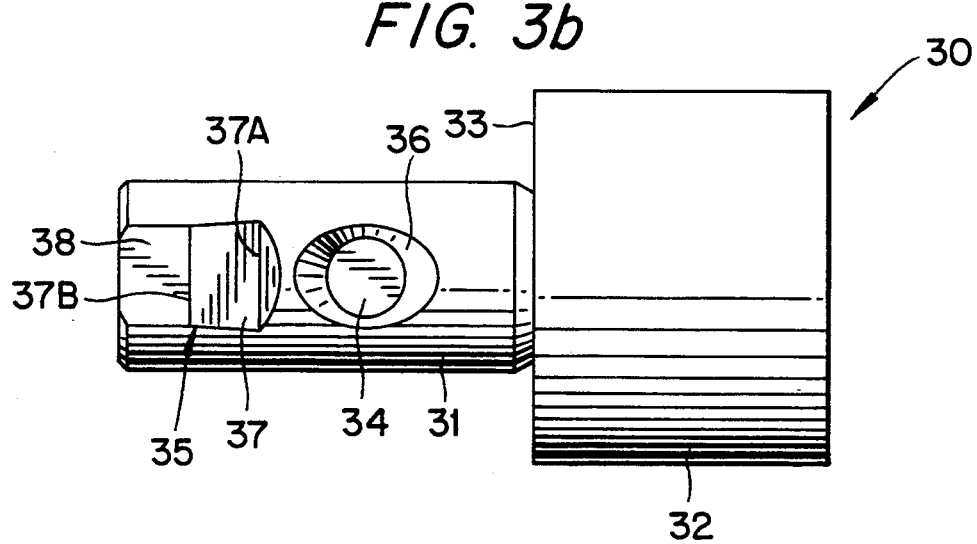
Figure 3C:
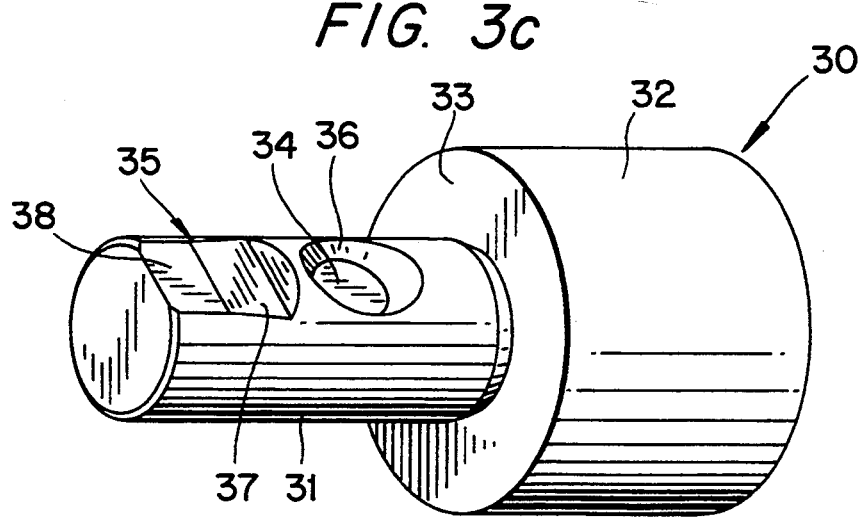

In FIGS. 3a-3c an embodiment of a tool shank 30 according to the present invention is shown. The tool shank 30 has a first portion 31, hereinafter called a clamping portion, and a second portion 32, hereinafter called a machining portion that carries the cutting inserts (not shown). The clamping portion 31 has a significantly smaller diameter than the machining portion 32. The resulting transition between the clamping portion 31 and the machining portion 32 is in the shape of a transition surface 33 that is located in a plane oriented transverse, preferably perpendicular (radially), to the longitudinal extension (axis) of the tool shank 30.

The clamping portion 31 is provided with a first recess 34 and a second recess 35. The first recess 34 has a sloping, preferably circumferential border wall 36 oriented at an oblique angle relative to a center axis 46 of the bore. The wall 36 is generally elliptical (see FIG. 3b). The second recess 35 includes two, preferably planar, longitudinally adjoining portions 37 and 38 that are somewhat inclined relative to each other, the inclination normally being in the order of 2° out of a coplanar relationship.

The second surface portion 38 is oriented parallel to the axis 46, and the surface portion 37 is positioned between the surface portion 38 and the machining portion. The surface portion 37 extends from the surface portion 38 toward the axis 37 at an angle of 2° relative to the plane of the surface portion 38. Thus, the surfaces 37, 38 form an angle A of 182° (see FIG. 6). An end 37A of the surface 37 is disposed closer to both the transition surface 33 and the axis 46 than the other end 37B.

Figure 4:
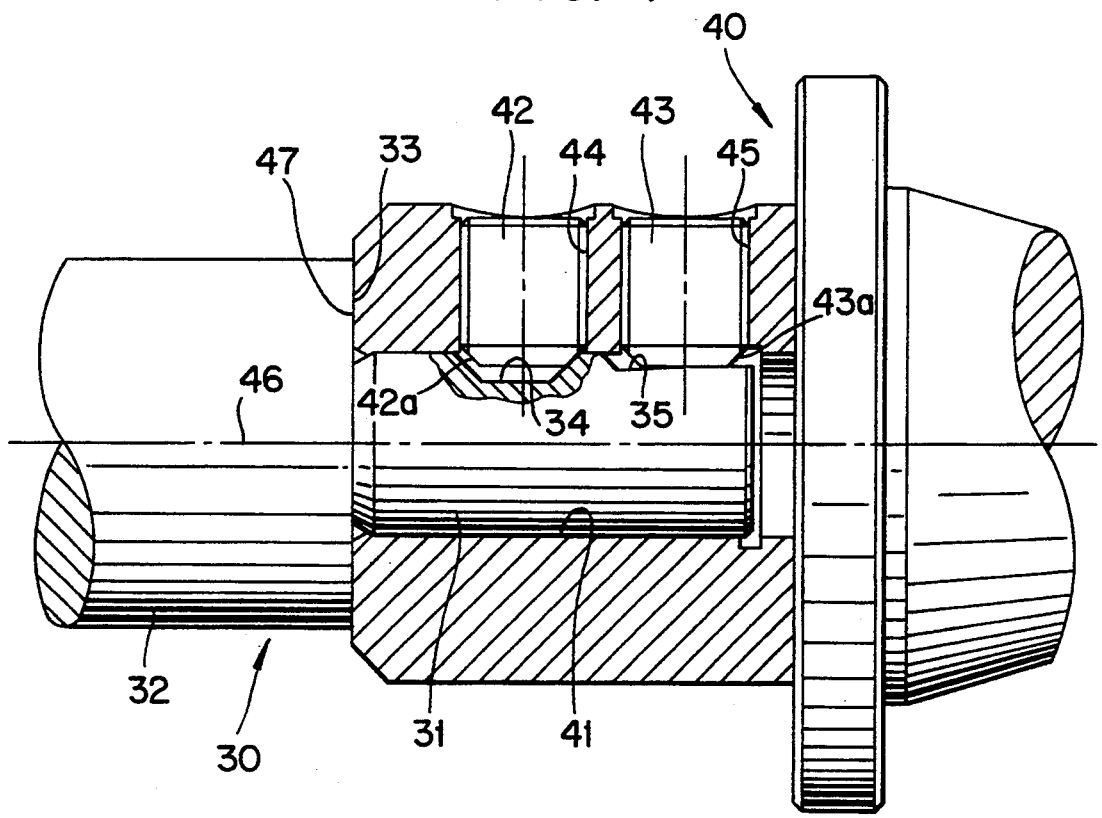
FIG. 4 shows a chuck and shank according to the present invention, the shank being the one disclosed in FIGS. 3a-3c.
Figure 6:
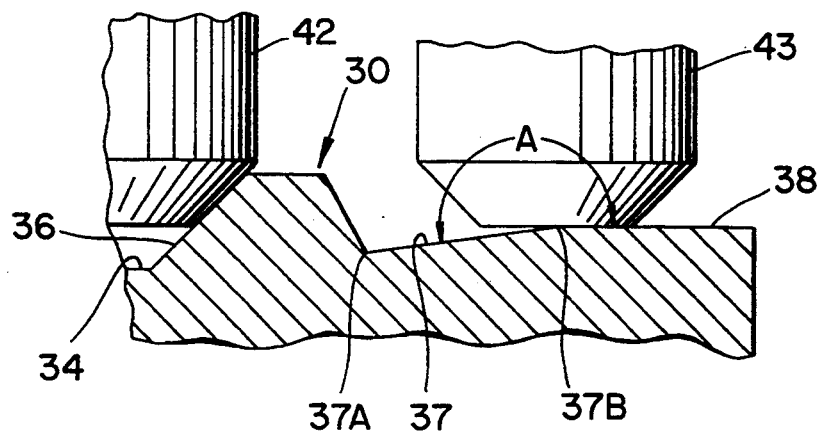
FIG. 6 is an enlarged fragmentary view of FIG. 4.

In FIGS. 4 and 6, the shank according to FIGS. 3a-3c is clamped in a chuck 40 according to the invention which includes characteristics of a Weldon-chuck. The chuck 40 has an axial boring 41 and a first and a second locking screw 42 and 43, respectively, received in mating first and second radial borings 44 and 45 in the chuck 40. At their inner ends the locking screws 42 and 43 have a bevelled portion 42a and 43a, respectively. The radial borings 44 and 45 have a longitudinal extension generally transverse, preferably perpendicular, to the longitudinal center axis 46 of the axial boring 41. The longitudinal center axis 46 is also the longitudinal center axis 46 of the chuck 40 and the shank 30 when the shank 30 is mounted in the axial boring 41.

The locking screws 42 and 43 are externally threaded while the radial borings 44 and 45 are internally threaded. When rotating the locking screws 42 and 43 they are displaced in radial direction of the chuck either inwardly or outwardly depending upon the direction of rotation of the locking screws 42 and 43. The chuck 40 also has a contact surface 47 at the entry of the axial boring 41, the contact surface extending transverse, preferably perpendicular, to the longitudinal center axis 46.

Before clamping the clamping portion 31 of the shank 30 in the axial boring 41 of the chuck 40 it is checked that the locking screws 42 and 43 are in such a position to allow the clamping portion 31 to be inserted in the axial boring 41 until the transition surface 33 abuts the contact surface 47 of the chuck 40. In the mounted position of the shank 30 in the chuck 40 the transition surface 33 has an extension transverse, preferably perpendicular, to the longitudinal center axis 46.

To effect clamping, the locking screws 42 and 43 are displaced towards the clamping portion 31 and come into engagement with the recesses 34 and 35 respectively. It is recommendable to have the first locking screw 42 activated first. As can be seen in FIG. 4 the location of the first recess 34 is such that the first recess 34 is contacted by the bevelled portion 42a of the first locking screw 42 at the portion of the first recess 34 that is closest to the second recess 35. There results a force applied to the shank having a longitudinal component directed away from the transition surface 33. This means that the cooperation between the first locking screw 42 and the first recess 34 tends to force the shank 30 further to the right in FIG. 4 thus establishing an increased contact pressure between the surfaces 33 and 47. The clamping of the clamping portion 31 in the axial boring 41 also involves an engagement between the second locking screw 43 and the second recess 35. This engagement, together with the engagement between the first locking screw 42 and the first recess 34, prevents the clamping portion 31 from rotating relative to the chuck 40. The screw 43 is arranged such that the end face thereof overlaps both of the surface portions 37 and 38 when the shank is in the clamped position of FIG. 4. Since the screw 43 is oriented perpendicular to the axis 46, the end face of the screw 43 will flushly engage the surface portion 38 (see FIG. 6).

The increased contact pressure referred to above results in an improved stability of the shank/chuck assembly that allows a load increase in the range of 50%. For a tool being subjected to radially forces, e.g., a milling tool, this means that the cutting depth can be increased by at least 50% before unacceptable vibrations arise.

Figure 5:
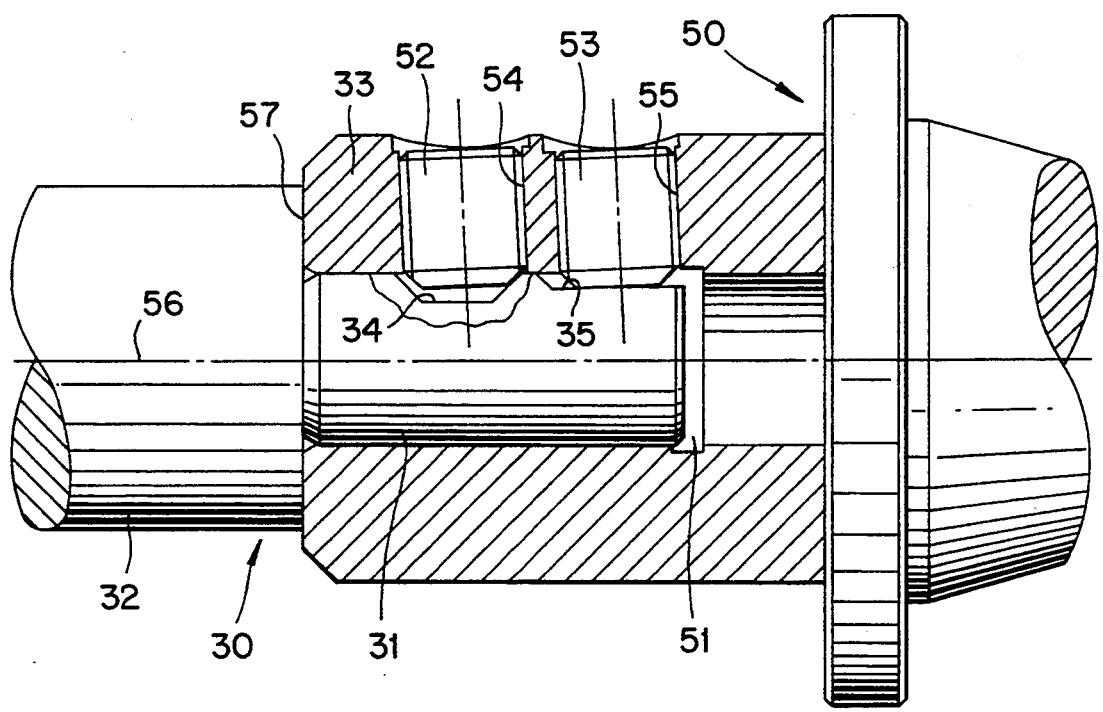
FIG. 5 shows a second chuck according to the invention holding the shank shown in FIGS. 3a-3c.
Figure 7:
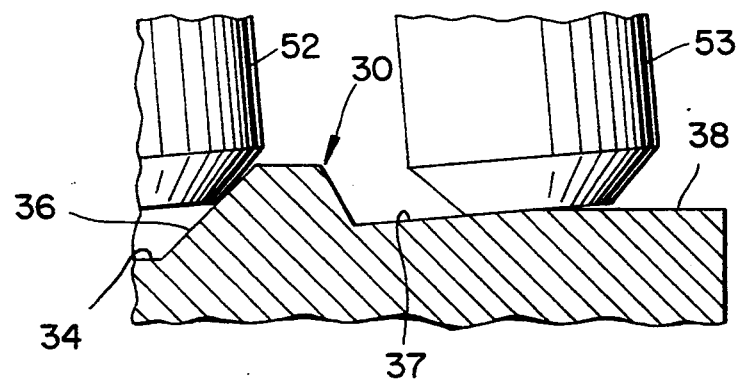
FIG. 7 is an enlarged fragmentary view of FIG. 5.

In FIGS. 5 and 7, the same shank 30 as in FIG. 4 is clamped in a chuck 50 according to the invention, which includes characteristics of a Whistlenotch-chuck. The chuck 50 has an axial boring 51 and a first and a second locking screw 52 and 53, respectively, received in mating first and second radial borings 54 and 55 in the chuck 50. At their inner ends the locking screws 52 and 53 have a bevelled portion 52a and 53a, respectively. The radial borings 54 and 55 have a longitudinal extension generally transverse to the longitudinal center axis 56 of the axial boring 51. The longitudinal center axis 56 is also the longitudinal center axis of the chuck 50 and the shank 30 when the shank 30 is mounted in the axial boring 51. However, the longitudinal extension of the radial borings 54 and 55 is not perpendicular to the longitudinal center axis 56 but offset an angle of 2° from the perpendicular direction. The inclination of the radial borings 54 and 55 is such that the inner end of the borings 54 and 55 is located further away from a contact surface 57 at the entry of the axial boring 51 than the outer end of the borings 54 and 55. The contact surface 57 has an extension oriented transverse, preferably perpendicular, to the longitudinal center axis 56.

Before clamping the clamping portion 31 of the shank 30 in the axial boring 51 of the chuck 50 it is checked that the locking screws 52 and 53 are in such a position as to allow the clamping portion 31 to be inserted in the axial boring 51 until the transition surface 33 abuts the contact surface 57 of the chuck 50. In the mounted position of the shank 30 in the chuck 50 the transition surface 33 has an extension transverse, preferably perpendicular, to the longitudinal center axis 56.

To effect clamping, the locking screws 52 and 53 are displaced towards the clamping portion 31 and come into engagement with the recesses 34 and 35, respectively. It is recommendable to have the first locking screw 52 activated first. As can be seen in FIG. 5 the location of the first recess 34 is such that the first recess 34 is contacted by the bevelled portion 52a of the first locking screw 52 at the portion of the first recess that is closest to the second recess 35. This means that the cooperation between the first locking screw 52 and the first recess 34 tends to force the shank 30 further to the right in FIG. 5 thus establishing an increased contact pressure between the surfaces 33 and 57. The clamping of the clamping portion 31 in the axial boring 51 also involves an engagement between the second locking screw 53 and the second recess 35. This engagement, together with the engagement between the first locking screw 52 and the first recess 34, prevents the clamping portion 31 from rotating relative to the chuck 50. Since the screw 53 is inclined relative to the radial direction by the same angle (e.g., 2°) as the surface portion 37 is oriented relative to the plane of the surface portion 38, the end face of the screw 53 will flushly engage the surface portion 37 (see FIG. 7).

Concerning the advantages of the increased contact pressure, reference is made to what is said in that respect in connection with the embodiment of FIG. 4.

It should also be pointed out that the different chucks shown in the appending figures are prior art standard chucks. This means that by using a shank according to the present invention in combination with prior art standard chucks significant improvements as regards stability of the shank are achieved.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A shank for carrying a milling tool and adapted to be clamped in a chuck, said shank comprising:
   a machining portion for carrying a milling tool; and
   a clamping portion extending from said machining portion, said clamping portion being of smaller cross section than said machining portion to form therebetween a transition surface extending transversely of a longitudinal axis of said clamping portion, said clamping portion including a cylindrical outer periphery having first and second recesses, including a first recess adapted to receive a first locking screw of a chuck for clamping the transition surface against the chuck, said second recess adapted to be abutted by a second locking screw of the chuck for preventing rotation of said shank about said axis, said second recess including first and second surfaces disposed longitudinally adjacent one another and being inclined relative to one another said first and second surfaces being arranged so that said second locking screw contacts only said first surface or said second surface.

2. A shank according to claim 1, wherein said transition surface extends perpendicular to said axis.

3. A shank according to claim 1, wherein at least a portion of said first recess disposed farthest from said transition surface includes a wall inclined obliquely relative to said axis so that contact of a first locking screw thereagainst produces a force having a longitudinal component directed away from said transition surface.

4. A shank according to claim 1, wherein said first and second surfaces form an angle of 182 degrees.

5. A shank according to claim 1, wherein one of said first and second surfaces is parallel to said axis, and the other of said first and second surfaces is inclined away from said one surface toward said axis such that one end of said other surface is disposed closer to both said transition surface and said axis than an opposite end thereof.

6. A shank according to claim 5, wherein said recess includes a circumferential wall extending at an oblique angle relative to said axis, said wall being of generally elliptical shape.

7. A shank according to claim 5, wherein said first and second surfaces form an angle of 182 degrees.

8. A shank according to claim 7, wherein said other surface is positioned between said transition surface and said one surface.

9. A shank according to claim 8, wherein each of said first and second surfaces is planar.

10. A shank according to claim 1, wherein said first and second recesses are longitudinally spaced apart.

11. In combination, a chuck and a shank, wherein:
    said chuck includes an axial bore, a contact surface disposed at an open end of said bore, and first and second locking screws movable toward and away from said bore, said locking screws having respective first and second axes oriented transversely relative to a longitudinal axis of said bore, and
    said shank including a machining portion for carrying a milling tool, and a clamping portion extending from said machining portion, said clamping portion being of smaller cross section than said machining portion to form therebetween a transition surface extending transversely of a longitudinal axis of said clamping portion, said clamping portion being receivable in said bore and including a cylindrical outer periphery having first and second recesses, said first recess arranged to receive said first locking screw for clamping said transition surface against said contact surface, said second recess arranged to be contacted by said second locking screw for preventing rotation of said shank within said bore, said second recess including first and second surfaces disposed longitudinally adjacent one another and being inclined relative to one another said second locking screw contacting only said first or said second surface.

12. A combination according to claim 11, wherein said first and second recesses are longitudinally spaced.

13. A combination according to claim 11, wherein at least a portion of said first recess disposed farthest from said transition surface includes a wall inclined obliquely relative to said axis so that contact of said first locking screw thereagainst produces a force having a longitudinal component directed away from said transition surface.

14. A combination according to claim 11, wherein said first and second surfaces form an angle of 182 degrees.

15. A combination according to claim 11, wherein one of said first and second surfaces is parallel to said axis of said clamping portion, and the other of said first and second surfaces is inclined away from said one surface toward said axis of said clamping portion, such that one end of said other surface is disposed closer to both said transition surface and said axis than an opposite end thereof.

16. A combination according to claim 11, wherein said first recess includes a circumferential wall extending at an oblique angle with respect to said axis for being engaged by said first locking screw, said wall being of generally elliptical shape.

17. A combination according to claim 15, wherein said first and second surfaces form an angle of 182 degrees.

18. A combination according to claim 17, wherein said other surface is positioned between said transition surface and said one surface.

19. A combination according to claim 18, wherein each of said first and second surfaces is planar.

20. A combination according to claim 11, wherein said first and second locking screws are longitudinally spaced, and said first and second recesses being longitudinally spaced.

* * * * *